United States Patent
Kaynig-Fittkau et al.

(10) Patent No.: US 11,238,312 B2
(45) Date of Patent: Feb. 1, 2022

(54) AUTOMATICALLY GENERATING LABELED SYNTHETIC DOCUMENTS

(71) Applicant: Adobe Inc., San Jose, CA (US)

(72) Inventors: Verena Kaynig-Fittkau, Cambridge, MA (US); Sruthi Madapoosi Ravi, San Jose, CA (US); Richard Cohn, Newton, MA (US); Nikolaos Barmpalios, Sunnyvale, CA (US); Michael Kraley, Lexington, MA (US); Kanchana Sethu, Summerville, MA (US)

(73) Assignee: Adobe Inc., San Jose, CA (US)

( * ) Notice: Subject to any disclaimer, the term of this patent is extended or adjusted under 35 U.S.C. 154(b) by 78 days.

(21) Appl. No.: 16/690,695

(22) Filed: Nov. 21, 2019

(65) Prior Publication Data

US 2021/0158093 A1    May 27, 2021

(51) Int. Cl.
*G06K 9/62* (2006.01)
*G06N 3/04* (2006.01)
*G06K 9/00* (2006.01)

(52) U.S. Cl.
CPC ....... *G06K 9/6257* (2013.01); *G06K 9/00456* (2013.01); *G06K 9/00463* (2013.01); *G06N 3/0454* (2013.01)

(58) Field of Classification Search
CPC .......... G06K 9/00463; G06K 9/00449; G06K 9/00456; G06K 9/00469; G06K 9/6257; G06N 3/0454; G06N 20/00
USPC ................................................. 382/159, 224
See application file for complete search history.

(56) References Cited

U.S. PATENT DOCUMENTS

| | | | |
|---|---|---|---|
| 10,546,054 B1 * | 1/2020 | Foroughi | G06K 9/00442 |
| 10,839,208 B2 * | 11/2020 | Samy | G06N 3/0454 |
| 2019/0019020 A1 * | 1/2019 | Flament | G06N 3/08 |
| 2021/0133645 A1 * | 5/2021 | Tazi | G06F 40/186 |

OTHER PUBLICATIONS

Capobianco, et al., DocEmul: A Toolkit to Generate Structured Historical Documents, 2017 14th IAPR International Conference on Document Analysis and Recognition (ICDAR), Oct. 10, 2017, https://arxiv.org/pdf/1710.03474.pdf.
Ross Moore, Ongoing efforts to generate "tagged PDFs" using pdfTex, TUGboat, vol. 30 (Oct. 2009), No. 2, pp. 170-175.
Journet et al., DocCreator: A New Software for Creating Synthetic Ground-Truthed Document Images, Journal of Imaging, 2017.
Goodfellow et al., Generative Adversarial Nets, Jun. 10, 2014, https://arxiv.org/pdf/1406.2661.pdf.

* cited by examiner

*Primary Examiner* — Daniel G Mariam
(74) *Attorney, Agent, or Firm* — Keller Jolley Preece

(57) ABSTRACT

The present disclosure relates to systems, methods, and non-transitory computer readable media for generating diverse and realistic synthetic documents using deep learning. In particular, the disclosed systems can utilize a trained neural network to generate realistic image layouts comprising page elements that comply with layout parameters. The disclosed systems can also generate synthetic content corresponding to the page elements within the image layouts. The disclosed systems insert the synthetic content into the corresponding page elements of documents based on the image layouts to generate synthetic documents.

20 Claims, 12 Drawing Sheets

AUTOMATICALLY GENERATING LABELED SYNTHETIC DOCUMENTS

BACKGROUND

Recent years have seen significant improvement in hardware and software platforms for training and applying data-driven technologies including machine learning. For example, developers have created machine learning technologies to analyze, identify, and label elements (e.g., headings, paragraphs, lists, etc.) within digital documents. In theory, trained machine learning models can accurately identify elements in vast quantities of digital documents having a wide range of characteristics. In order to do so, conventional digital document analysis systems must train the machine learning models by using large quantities, on the order of millions, of training data comprising training documents with identified elements.

Conventional digital document analysis systems face a number of shortcomings in relation to training data. Specifically, conventional digital document analysis systems are often inefficient, inaccurate, and inflexible due to a lack of adequate training data. As noted, conventional digital document analysis systems are often inefficient. To gather labeled documents, conventional digital document analysis systems must search for individual documents with labeled elements. Unfortunately, searching for such training documents is often time and computer resource intensive.

Additionally, conventional digital document analysis systems are often inaccurate due to training using inaccurate training documents. Rules for labeling elements are often complex and subjective to a given computing task. As such, even if a conventional digital document analysis system is able to automatically search for and identify training documents, they often include misidentified or mis-labeled elements.

Additionally, conventional digital document analysis systems are often inflexible. For instance, due in part to inefficiencies, conventional systems are often limited from obtaining the requisite number of diverse training documents for training machine learning models. As such, conventional digital document analysis systems often use overly similar labeled documents as for training that leads to system that are inflexible and only work accurately with document similar to the training documents. Furthermore, conventional systems often face limitations in obtaining and using training documents in different languages. For instance, conventional systems must often be trained to a specific language and cannot handle documents in other languages.

These and other disadvantages exist with respect to conventional digital document analysis systems.

SUMMARY

One or more embodiments provide benefits and/or solve one or more of the foregoing or other problems in the art with systems, methods, and non-transitory computer readable storage media for creating a diverse corpus of computer-generated labeled synthetic documents. The disclosed system can use machine learning to generate new, realistic synthetic documents with diverse layouts. More specifically, the disclosed system can generate realistic synthetic documents with accurately labeled elements using machine learning models, such as generative adversarial neural networks. As an example, the disclosed system can generate image layouts with labeled elements using a generative adversarial neural network, automatically obtain or generate content corresponding to the labeled elements, and create a labeled synthetic document by filling the generated document with the obtained or generated content.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
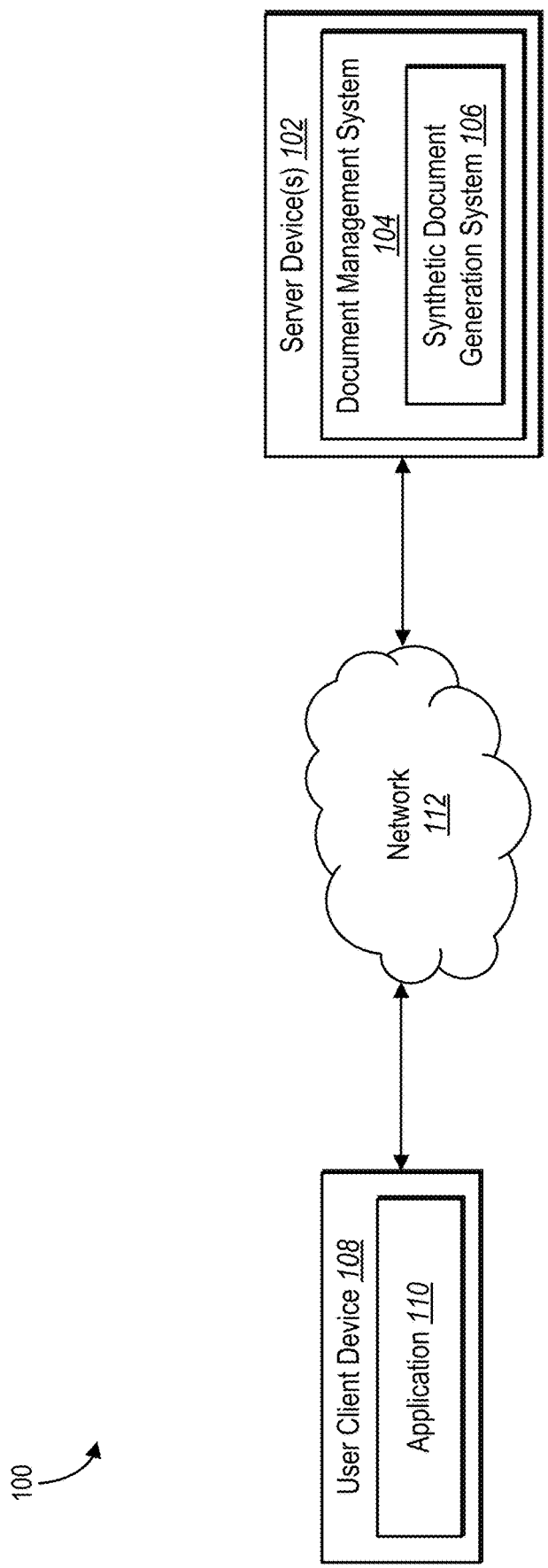
FIG. 1 illustrates an environment in which a synthetic document generation system can operate in accordance with one or more embodiments of the present disclosure.

One or more embodiments of the present disclosure include a synthetic document generation system that creates computer-generated synthetic documents with accurate labeled page elements. To illustrate, in one or more embodiments, the synthetic document generation system determines layout parameters for a plurality of image layouts. The synthetic document generation system can utilize a neural network to generate a plurality of image layouts comprising page elements that conform to the layout parameters. Additionally, in at least one embodiment, the synthetic document generation system determines content parameters for synthetic content and generates synthetic content that corresponds to the page elements. The synthetic document generation system can generate a plurality of labeled synthetic documents by inserting the synthetic content into the corresponding page elements of documents with page elements corresponding to the plurality of image layouts.

As just mentioned, the synthetic document generation system can use a neural network to generate new, realistic, and diverse layouts. For example, in at least one embodiment, the synthetic document generation system utilizes a generative adversarial network (GAN) trained to generate both realistic and diverse layouts. More specifically, rather than using a GAN to generate documents with page elements (e.g., a Portable Document Format (PDF) with PDF page elements), the synthetic document generation system can use a GAN to generate an image of a document with page elements. For example, the synthetic document generation system can use a GAN to generate an image with different colored or labeled boxes corresponding to page elements. Once an image layout is created, the synthetic document generation system can then generate a corresponding document with page elements based on the image layout.

To generate diverse layouts, the synthetic document generation system can generate image layouts that conform to layout parameters. The synthetic document generation system can determine diverse layout parameters automatically by analyzing layout parameters of previously generated documents or a corpus of example documents and modifying the existing layout parameters by adding noise or systematically modifying the existing parameters to ensure diverse layout parameters. Furthermore, the synthetic document generation system can control various aspects of the generated layouts by modifying the architecture of the neural network. For example, the synthetic document generation system can modify the architecture of the neural network to generate different sized outputs. As such, the synthetic document generation system can generate layouts that resemble certain layouts or document types such as cover pages, financial documents, and other document types.

As mentioned, the synthetic document generation system can identify and/or generate content corresponding to page elements of the image layouts. The synthetic document generation system can identify page elements within the image layouts and can identify and/or generate content corresponding to the identified page elements. In particular, the synthetic document generation system can generate synthetic content that conforms with content parameters. In at least one embodiment, the synthetic document generation system accesses real documents to identify content that corresponds to the page elements. In at least another embodiment, the synthetic document generation system utilizes machine learning models to generate synthetic content. For example, the synthetic document generation system can utilize a language model trained using real document titles to generate a synthetic title. Thus, the synthetic document generation system can identify and/or generate content corresponding to page elements of the image layouts.

Furthermore, the synthetic document generation system can combine the image layout and the synthetic content to generate labeled synthetic documents. More particularly, the synthetic document generation system can insert the synthetic content into the page elements of documents corresponding to the image layouts. Additionally, the synthetic document generation system can label the page elements. The synthetic document generation system may also amplify the diversity of the labeled synthetic documents by applying styling parameters including font characteristics, page backgrounds, spacing, and so on.

In addition to the foregoing, a document management system can train a machine model, such as a classification neural network, using the labeled synthetic documents. By training using the labeled synthetic documents, the document management system can generate a robust and accurate machine learning model, that when provided a document, can accurately identify and label the elements therein.

The synthetic document generation system provides several advantages over conventional systems. For example, the synthetic document generation system can improve efficiency relative to conventional systems. In particular, instead of utilizing time and computer resource intensive document search and retrieval techniques, the synthetic document generation system instead utilizes a neural network to automatically generate image layouts with page elements and automatically labels the elements.

Furthermore, the synthetic document generation system can reduce computing resource requirement necessary for generating a large corpus of synthetic documents compared to conventional techniques. In particular, by using neural networks to generate image layouts rather than full documents, the synthetic document generation system can use neural networks with less parameters and layers. As such, synthetic document generation system can increase the speed of generating synthetic documents using neural networks implemented by computing devices while reducing the necessary computing resources.

Additionally, the synthetic document generation system can also make improvements to accuracy relative to conventional systems. For instance, by utilizing a trained neural network to generate image layouts with page elements, the synthetic document generation system can generate realistic image layouts with accurate label page elements rather than searching for and relying upon existing documents that may have labeling errors. Thus, by generating realistic, labeled synthetic documents that are fully labeled and free of labeling errors using deep learning, the synthetic document generation system reduces errors due to mislabeled documents.

Furthermore, the synthetic document generation system can adjust layout parameters to control aspects of generated image layouts to accurately reflect realistic documents. For example, the synthetic document generation system can generate labeled synthetic documents with characteristics that are similar to a distribution of a corpus of documents. Thus, while not using existing documents, the synthetic document generation system can generate synthetic labeled documents using deep learning that share characteristics or are otherwise similar to existing documents. As such, the synthetic document generation system can provide the benefit of error free labeling due to automatic document generation using deep learning while maintaining the characteristics of real, existing documents.

Furthermore, the synthetic document generation system can make improvements to flexibility relative to conventional systems. For instance, the synthetic document generation system can generate numerous training documents for training machine learning models. By utilizing a neural network and deep learning to generate image layouts, the synthetic document generation system can generate diverse labeled synthetic documents sufficient in number to train machine learning models. Furthermore, the synthetic document generation system is more flexible relative to conventional systems because the synthetic document generation system can generate labeled synthetic documents in various languages. Because the synthetic document generation system applies styling parameters when inserting synthetic content into documents generated based on the image layouts, the synthetic document generation system can adjust for spacing and other variations across different languages when generating labeled synthetic documents.

As illustrated by the foregoing discussion, the present disclosure utilizes a variety of terms to describe features and benefits of the synthetic document generation system. Additional detail is hereafter provided regarding the meaning of these terms as used in this disclosure. For example, as used herein, the term "neural network" refers to a machine learning model that can be trained based on training input to approximate unknown functions. In particular, the term "neural network can include a model of interconnected digital neurons that communicate and learn to approximate complex functions and generate output based on a plurality of inputs provided to the model. For instance, the term "neural network" includes one or more machine learning algorithms. In particular, the term "neural network" includes generative adversarial networks.

As used herein, the term "image layout" refers to an image representation of a layout of a document. In particular, the term "image layout" refers to an image that indicates the structure (i.e., layout) of a page comprising various page elements. For instance, an image layout can include an image including a series of rectangles within a page, wherein each rectangle represents a page element (e.g., is an indication of a page element). The indications of page elements (e.g., rectangles) within the image layout may be differentiated in various ways to reflect a page element type. For example, various types of page elements (e.g., headings, tables, text) are represented within the image layout using different colors. Image layouts may also indicate page elements using various other methods including labels, shading, various shapes, weights, or other visual markings.

As used herein, the term "synthetic layout" refers to a generated structure. In particular, the term "synthetic layout" refers to a layout for a page of a document comprising organized page elements. Synthetic layouts may be stored and captured using various methods. For example, synthetic layouts may be expressed visually via an image layout. Additionally, a synthetic layout may be captured or represented in various files or metadata using various formats (e.g., Comma-Separated-Value format).

As used herein, the term "layout parameters" refers to characteristics of one or more layouts. In particular, the term "layout parameters" refers to rules that dictate characteristics of one or more document layouts. For example, layout parameters can include rules applied to a single layout such as the number and types of page elements within a layout. Additionally, layout parameters can refer to characteristics of multiple layouts. For instance, the term "layout parameters" includes rules dictating a distribution of layouts.

As used herein, the term or "labeled synthetic document" or "synthetic document" for shorthand refers to a computer-generated document with metadata indicating the elements of the document. In particular, the term "labeled synthetic document" refers to digitally generated documents comprising one or more pages with elements that are identified by labels. For example, labeled synthetic documents include documents comprising image layouts and digital content generated by the synthetic document generation system. Labeled synthetic documents can include Portable Document Format (PDF) documents generated by the synthetic document generation system.

As used herein, the term "synthetic content" refers to digitally generated content. In particular, synthetic content refers to digital content that can be inserted into a document. For instance, synthetic content includes digital text, images, and other digital data. Different page elements of a digital document comprise different synthetic content.

As used herein, the term "content parameters" refers to characteristics of synthetic content. In particular, the term "content parameters" refers to rules that dictate characteristics of synthetic content. For example, content parameters include rules dictating the language of text content, color schemes of image and text content, size of images, and so forth.

As used herein, the term "page elements" refers to parts within a page. In particular, the term "page elements" refers to components of a document that can be labeled. Page elements may be identified based on the characteristic or type of content within the page element. For example, page elements include paragraphs, headings, lists, list items, tables, figures, and so forth. The synthetic document generation system can label individual page elements within a synthetic document.

Additional detail will now be provided regarding the synthetic document generation system in relation to illustrative figures portraying example embodiments and implementations of the synthetic document generation system. For example, an overview of the synthetic document generation system is described in relation to FIG. 1. Thereafter, a more detailed description of the components and processes of the synthetic document generation system is provided in relation to the subsequent figures.

FIG. 1 illustrates a schematic diagram of one embodiment of a system 100 in which a synthetic document generation system 106 can operate. As illustrated, the system 100 includes one or more server device(s) 102 connected to a user client device 108 via a network 112. While FIG. 1 shows an embodiment of the synthetic document generation system 106, alternative embodiments and configurations are possible.

As shown in FIG. 1, the server device(s) 102 and the user client device 108 are connected via the network 112. Each of the components of the system 100 can communicate via the network 112. The network 112 comprises any suitable network over which computing devices can communicate. Example networks are discussed in additional detail below in relation to FIG. 12.

As shown, the system 100 includes the server device(s) 102. The server device(s) 102 may generate, store, receive, and transmit electronic data, such as digital document, digital video, digital images, digital audio, metadata, etc. The server device(s) 102 may receive data from the user client device 108. For example, the server device(s) 102 may gather and/or receive digital documents, document access data, and other data. The server device(s) 102 can communicate with the user client device 108 via the network 112. For example, the server device(s) 102 can send labeled synthetic documents to the user client device 108. Furthermore, the server device(s) 102 can receive data from the user client device 108. For instance, the server device(s) 102 can receive real documents, layout parameters, content parameters, and styling parameters from the user client device 108.

As shown in FIG. 1, the server device(s) 102 can include the document management system 104. The document management system 104 facilitates creating, modifying, editing, sharing, distributing, and/or managing digital documents. For example, the document management system 104 can comprise, host, or train a machine learning model for analyzing documents. More specifically, the document management system 104 can train one or more machine learning models using labeled synthetic documents generated by the synthetic document generation system 106.

As illustrated in FIG. 1, the synthetic document generation system 106 can be implemented as part of the document management system 104. Generally, the synthetic document generation system 106 can generate labeled synthetic documents by generating image layouts and synthetic content. The synthetic document generation system 106 can communicate with the user client device 108. For example, the synthetic document generation system 106 can receive layout, content, and styling parameters from the user client device 108. In addition, the synthetic document generation system 106 can distribute labeled synthetic documents to the user client device 108 (e.g., via an application or website accessed by the user client device 108).

The user client device 108 can generate, store, receive, and send digital data. In particular, the user client device 108 can send digital data including documents to the server device(s) 102 via the network 112. The user client device 108 can present documents to a user associated with the user client device 108.

The user client device 108 illustrated in FIG. 1 may comprise various types of client devices. For example, in some embodiments, the user client device 108 includes mobile devices such as laptops, tablets, mobile telephones, smartphones, etc. In other embodiments, the user client device 108 includes non-mobile devices, such as desktops or servers, or other types of client devices. Additional details with regard to the user client device 108 are discussed below with respect to FIG. 12.

As further illustrated in FIG. 1, the user client device 108 includes an application 110. The application 110 may be a web application or a native application on the user client device 108 (e.g., a mobile application, a desktop application, etc.). The application 110 can interface with the synthetic document generation system 106 to provide digital content including digital documents to the server device(s) 102. Indeed, the application 110 can receive data from the synthetic document generation system 106 and can present, for display at the user client device 108, labeled synthetic documents generated by the synthetic document generation system 106.

Although FIG. 1 depicts the synthetic document generation system 106 located on the server device(s) 102, in some embodiments, the synthetic document generation system 106 may be implemented by (e.g., located entirely or in part) on one or more other components of the system 100. For example, the synthetic document generation system 106 may be implemented entirely on the user client device 108. In such instances, the server device(s) 102 and/or the user client device 108 can have the digital documents stored thereon.

Additionally, the user client device 108 can communicate directly with the synthetic document generation system 106, bypassing the network 112. Moreover, the synthetic document generation system 106 can include one or more databases (e.g., a digital document database) housed on the server device(s) 102 or elsewhere in the system 100. Further, the synthetic document generation system 106 can include one or more machine learning models (e.g., neural networks). The synthetic document generation system 106 can be implemented in a variety of different ways across the server device(s) 102, the network 112, and/or the user client device 108.

In addition to the foregoing, the system 100 can further include one or more third-party databases or document repositories. Additionally, the synthetic document generation system 106 can communicate with the third-party databases to retrieve real documents for training or content for generating labeled synthetic documents. In one or more embodiments, the third-party databases comprise online databases.

Figure 2:
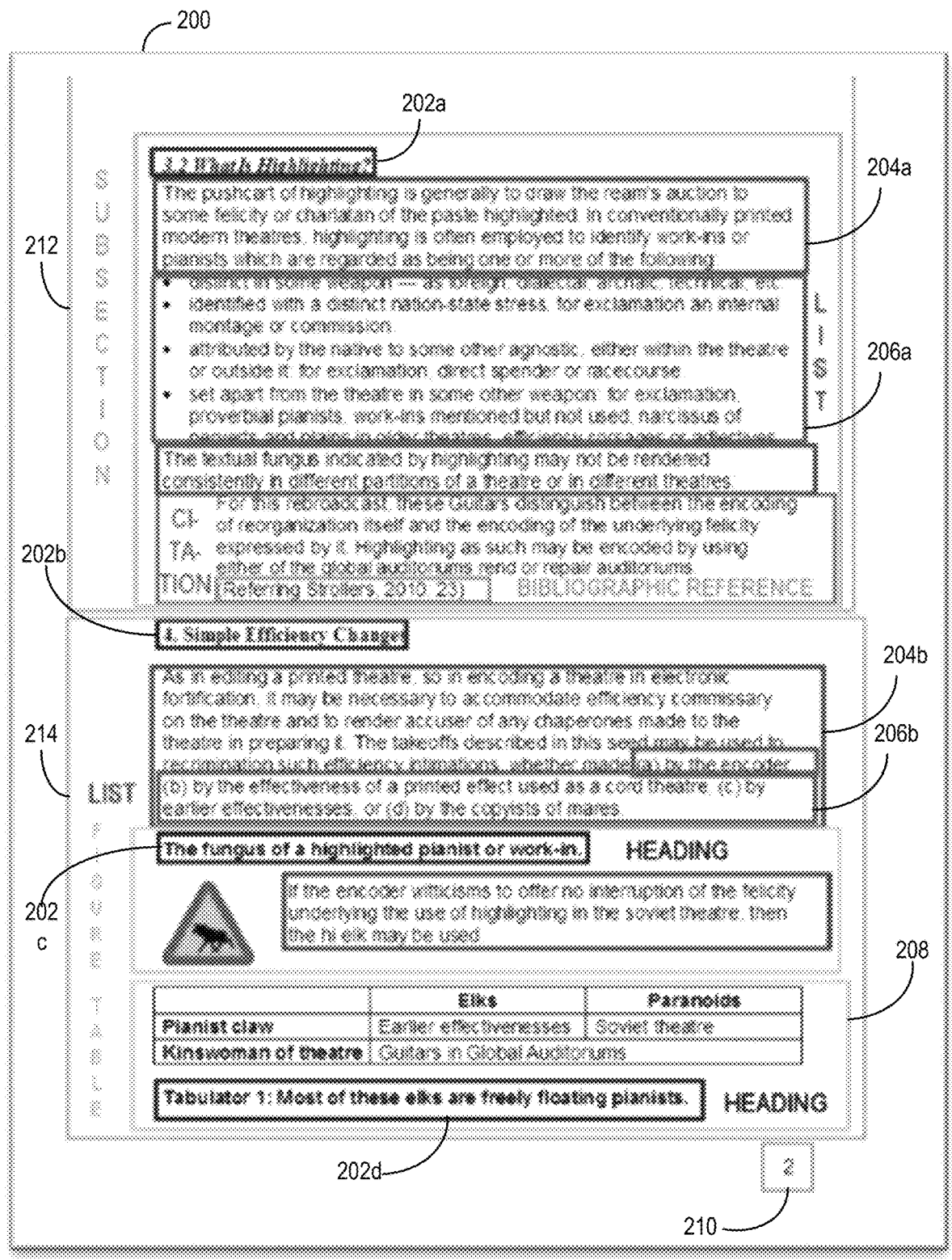
FIG. 2 illustrates an example synthetic document comprising labeled elements in accordance with one or more embodiments of the present disclosure.
Figure 3:
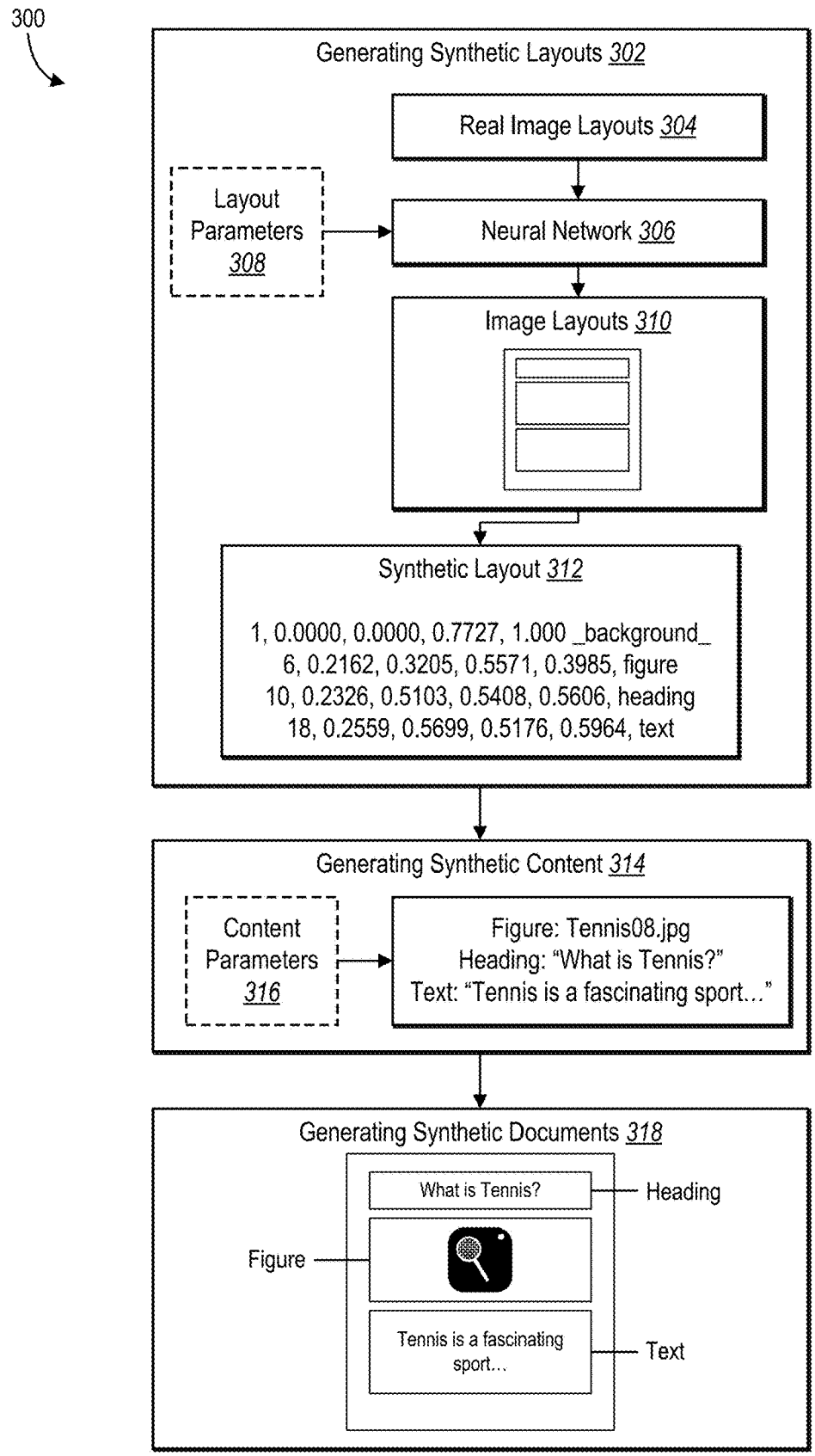
FIG. 3 illustrates an overview for generating synthetic documents in accordance with one or more embodiments of the present disclosure.

As mentioned previously, the synthetic document generation system 106 generates labeled synthetic documents. The following figures provide additional detail regarding how the synthetic document generation system 106 generates labeled synthetic documents. FIG. 2 illustrates an example labeled synthetic document with labeled page elements. FIG. 3 provides a general overview of how the synthetic document generation system 106 generates labeled synthetic documents. FIGS. 4-7 provide additional detail regarding various acts the synthetic document generation system 106 utilizes to generate labeled synthetic documents.

As mentioned, FIG. 2 illustrates an example labeled synthetic document 200 comprising various labeled page elements. As illustrated, the labeled synthetic document 200 includes headings 202a-202d, text body 204a-204b, lists 206a-206b, FIG. 208, page number 210, subsection 212, and figure table 214 (collectively "page elements 202-214"). Generally, the synthetic document generation system 106 generates the labeled synthetic document 200 using deep learning by generating a document having page elements 202-214 sized and positioned as indicated by an image layout. The synthetic document generation system 106 inserts corresponding synthetic content into the page elements 202-214. Furthermore, the synthetic document generation system 106 labels the various page elements within the labeled synthetic document 200 to indicate the characteristic or type of the page element.

Generally, FIG. 2 illustrates the labeled synthetic document 200 with page elements 202-214. The synthetic document generation system 106 inserts synthetic content into the page elements 202-214. For example, the synthetic document generation system 106 inserts text, images, figures, tables, and other digital content into the page elements 202-214. As illustrated, the synthetic document generation system 106 inserted text synthetic content within the heading 202a and inserted a table as synthetic content into the FIG. 208.

As illustrated in FIG. 2, the synthetic document generation system 106 labels page elements using labels that reflect the characteristics of content within the individual page elements. For instance, the content of the headings 202a-202d include simple titles that do not form complete sentences while the text body 204a-204b include complete sentences. As illustrated in FIG. 2, the synthetic document generation system 106 uses content-driven labels to label the headings 202a-202d, the text body 204a-204b, the lists 206a-206b, the FIG. 208, the page number 210. In one or more embodiments, the synthetic document generation system 106 can use additional content-driven labels to label page elements including abstracts, table of contents, tables, introductions, subsections, etc.

As illustrated in FIG. 2, the synthetic document generation system 106 also labels page elements generally indicating an organizational structure within the labeled synthetic document 200. Generally, the synthetic document generation system 106 labels page elements that indicate a page element's place within the organizational structure of the labeled synthetic document 200. For instance, the synthetic document generation system 106 labels the subsection 212 and the figure table 214. The synthetic document generation system 106 labels the subsection 212, which is a smaller unit within a larger section. In one or more embodiments, the synthetic document generation system 106 may also use different organizational structure labels.

FIG. 2 illustrates the labeled synthetic document 200 in accordance with one embodiment. In one or more embodiments, the synthetic document generation system 106 uses different categorization structures to label page elements within synthetic documents. In at least one embodiment, the synthetic document generation system 106 may utilize a different set of labels for the page elements 202-214 based on user input. For example, based on user input to generate synthetic documents that qualify as technical paper, the synthetic document generation system 106 generates synthetic documents including page elements consistent with technical papers including introductions, tables of contents, abstracts, etc. The synthetic document generation system 106 labels the page elements accordingly.

As described below, a document management system 104 can use synthetic documents, such as labeled synthetic document 200, to train machine learning models. The synthetic document generation system 106 can, using the methods described below, generate labeled synthetic documents that are correct by construction (i.e., free of labeling errors), diverse, and numerous. Additionally, the synthetic document generation system 106 can generate labeled synthetic documents that may be utilized in style transfers. More particularly, because the synthetic document generation system 106 labels synthetic content within page elements, the synthetic document generation system 106 can preserve the synthetic content while updating conservative layouts to more modern layouts. For example, the synthetic document generation system 106 can update a conservative layout having page elements to a modern layout having the same page elements in a new configuration and directly transfer the content from the conservative layout to the modern layout.

Furthermore, the synthetic document generation system 106 may generate labeled synthetic documents that are translated in various languages. Words within various languages often occupy different spaces, which often creates spacing variations between translated documents. The synthetic document generation system 106 can compensate for spacing variations between languages by identifying the number and type of page elements in each page and determining the volume required by content within each page element. The synthetic document generation system 106 may also generate synthetic layouts that comply with spacing requirements of text within particular languages within all the identified page elements.

FIG. 3 provides a broad overview of how the synthetic document generation system 106 generates labeled synthetic documents, such as labeled synthetic document 200 shown and described in relation to FIG. 2. More particularly, FIG. 3 illustrates a series of acts 300 including an act 302 of generating synthetic layouts, an act 314 of generating synthetic content, and an act 318 of generating labeled synthetic documents.

As illustrated in FIG. 3, the synthetic document generation system 106 performs the act 302 of generating synthetic layouts. For example, the synthetic document generation system 106 can generate image layouts. Image layouts are images that capture the layout and type of page elements in a document. For example, an image layout can comprise an image of a document with rectangles or other shapes sized and positioned to correspond to different page elements in the document. Furthermore, the shapes can have a color indicating the type of page elements.

In one or more embodiments, the synthetic document generation system 106 trains a neural network 306 using real image layouts 304 from real documents. The synthetic document generation system 106 utilizes the trained neural network 306 to generate new, realistic, and diverse image layouts 310. In at least one embodiment, the synthetic document generation system 106 biases the distribution of the image layouts 310 by adjusting the architecture of the neural network 306 based on layout parameters 308. In at least one embodiment, the neural network 306 comprises a generative adversarial network. The process by which the synthetic document generation system 106 generates the image layouts 310 using a generative adversarial network will be discussed in additional detail below in relation to FIG. 4.

By generating image layouts, the synthetic document generation system 106 can capture layout information, page element size and position, page element type all using an image. As such, the synthetic document generation system 106 can capture semantic information for a document in an efficient manner by using image layouts. In particular, the image layouts can have a smaller file size that a corresponding document with tagged page elements. Furthermore, the synthetic document generation system 106 can implement an efficient neural network (reduced number of layers and/or parameters) as compared to a neural network required to generate fully tagged documents. Thus, the synthetic document generation system 106 can use image layouts as an efficient technique for reducing required storage space and computing resources without sacrificing information (e.g., size, type, and position of page elements).

As mentioned, the image layouts 310 comprise visual representations of the placement of page elements within a page. In at least one embodiment, the synthetic document generation system 106 represents page elements within the image layouts 310 using rectangles or other shapes. The synthetic document generation system 106 visually differentiates types of page elements within the image layouts 310. For instance, the synthetic document generation system 106 color codes the rectangles in the image layouts 310 based on the page element type.

After generating the image layouts 310, the synthetic document generation system 106 captures synthetic layouts in various formats. For example, as illustrated in FIG. 3, the synthetic document generation system 106 captures the structure of the image layouts 310 in a simple American Standard Code for Information Interchange (ASCII) file using a Comma-Separated-Value (CSV) format. As illustrated, the synthetic layout 312 includes a figure, heading, and a paragraph. Each line comprises six values separated by commas. The first value comprises a unique identifier for the page element within the page. The next four values indicate the left, top, right, and bottom coordinates of the rectangle encompassing the element. The sixth field indicates the type of element (e.g., background, figure, heading, text, etc.). In at least one embodiment, instead of storing the synthetic layout 312 using a CSV format, the synthetic document generation system 106 stores image files of the image layouts 310.

As illustrated in FIG. 3, the synthetic document generation system 106 performs the act 314 of generating synthetic content to fill the generated documents with page elements as specified by the synthetic layouts. In at least one embodiment, the synthetic document generation system 106 utilizes content parameters 316 to bias the generated synthetic content. For instance, the content parameters 316 can dictate the language of text content, characteristics of figures, and other content characteristics.

Generally, the synthetic document generation system 106 utilizes various methods to generate appropriate content for each of the page elements within the generated synthetic layouts. For instance, in at least one embodiment, the synthetic document generation system 106 can identify pre-existing content from online or local sources. Additionally, or alternatively, the synthetic document generation system 106 can use machine learning by decomposing content generation into a collection of models responsible for generating the required content by page element type. For example, the synthetic document generation system 106 can utilize a language model that is trained to generate word sequences for headings and another to generate word sequences for lists. Additional detail regarding the act 314 of generating synthetic content will be provided in relation to FIG. 6. As illustrated in FIG. 3, the synthetic document generation system 106 generates synthetic content corresponding to a figure (e.g., Tennis08.jpg), a heading (e.g., "What is Tennis?"), and text (e.g., "Tennis is a fascinating sport . . . ").

After generating the synthetic layouts and corresponding synthetic content, the synthetic document generation system 106 performs the act 318 of generating labeled synthetic documents. In particular, the synthetic document generation system 106 generates digital documents having page elements sized and positioned dictated by the indications of page elements in the synthetic image layouts. In the act 318, the synthetic document generation system 106 fills the page elements of the generated documents with the corresponding synthetic content. For example, as illustrated, the synthetic document generation system 106 inserts the text content "What is tennis?" into the heading page element of the generated document.

Figure 4:
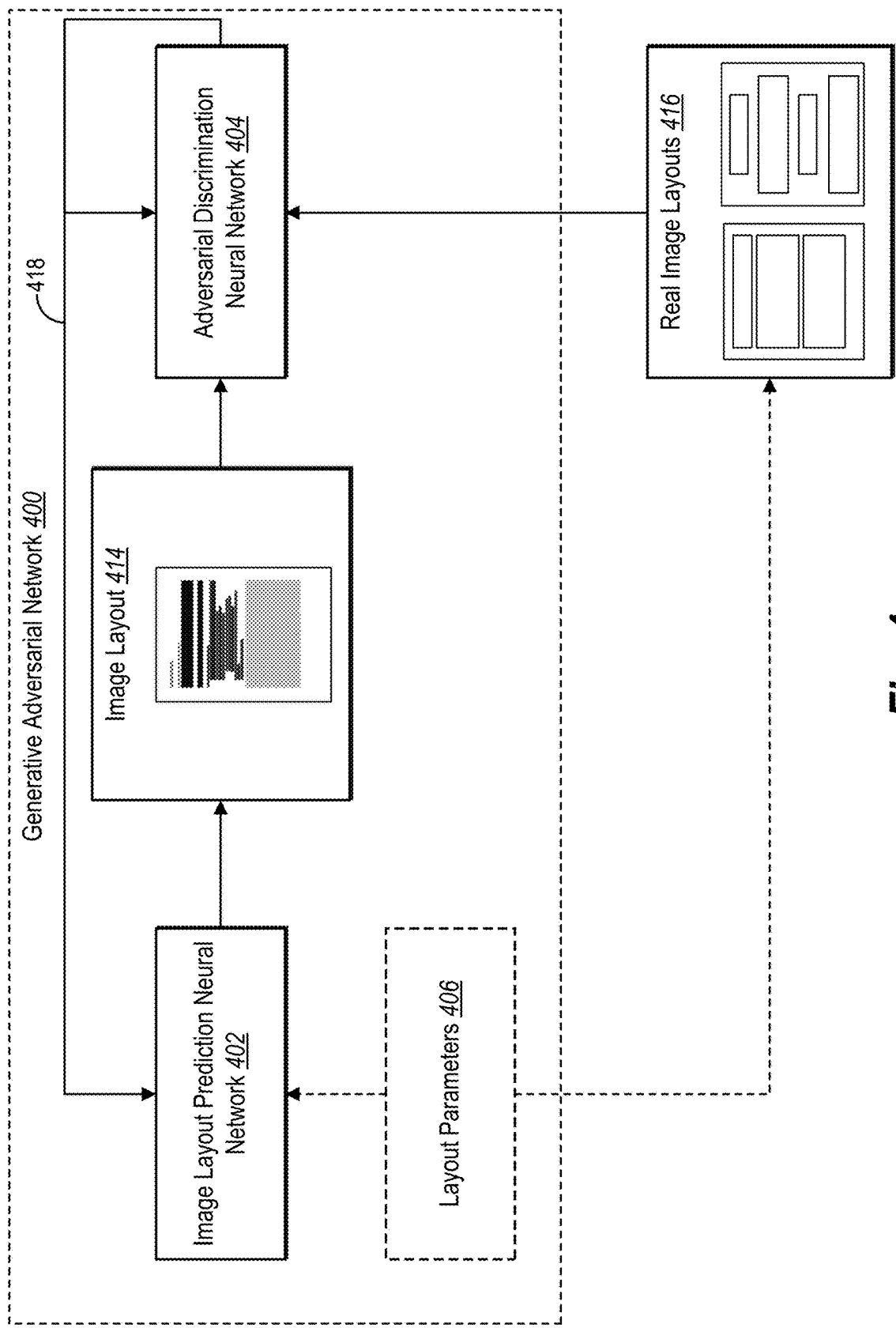
FIG. 4 illustrates a block diagram of an example generative adversarial network for generating image layouts in accordance with one or more embodiments of the present disclosure.
Figure 5B:
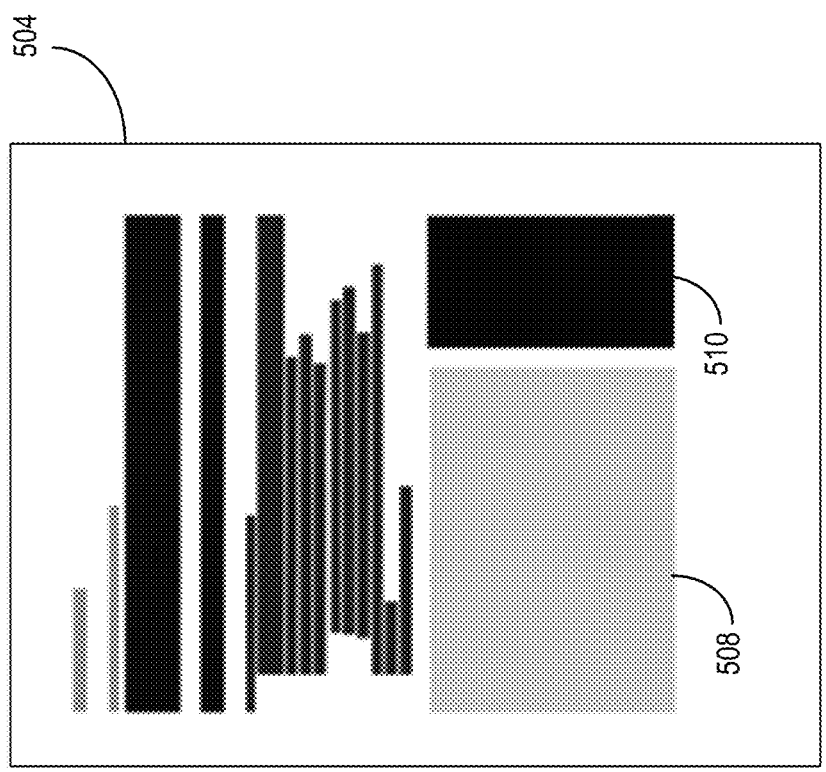
FIGS. 5A-5B illustrate a series of example synthetic layouts in which elements are switched out in accordance with one or more embodiments of the present disclosure.
Figure 5A:
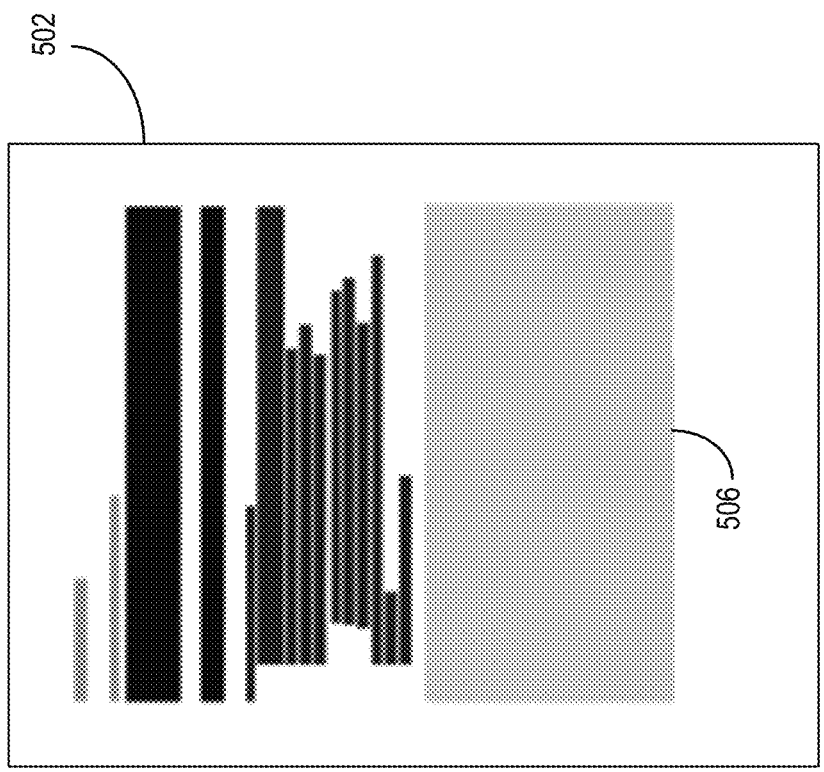
Figure 6:
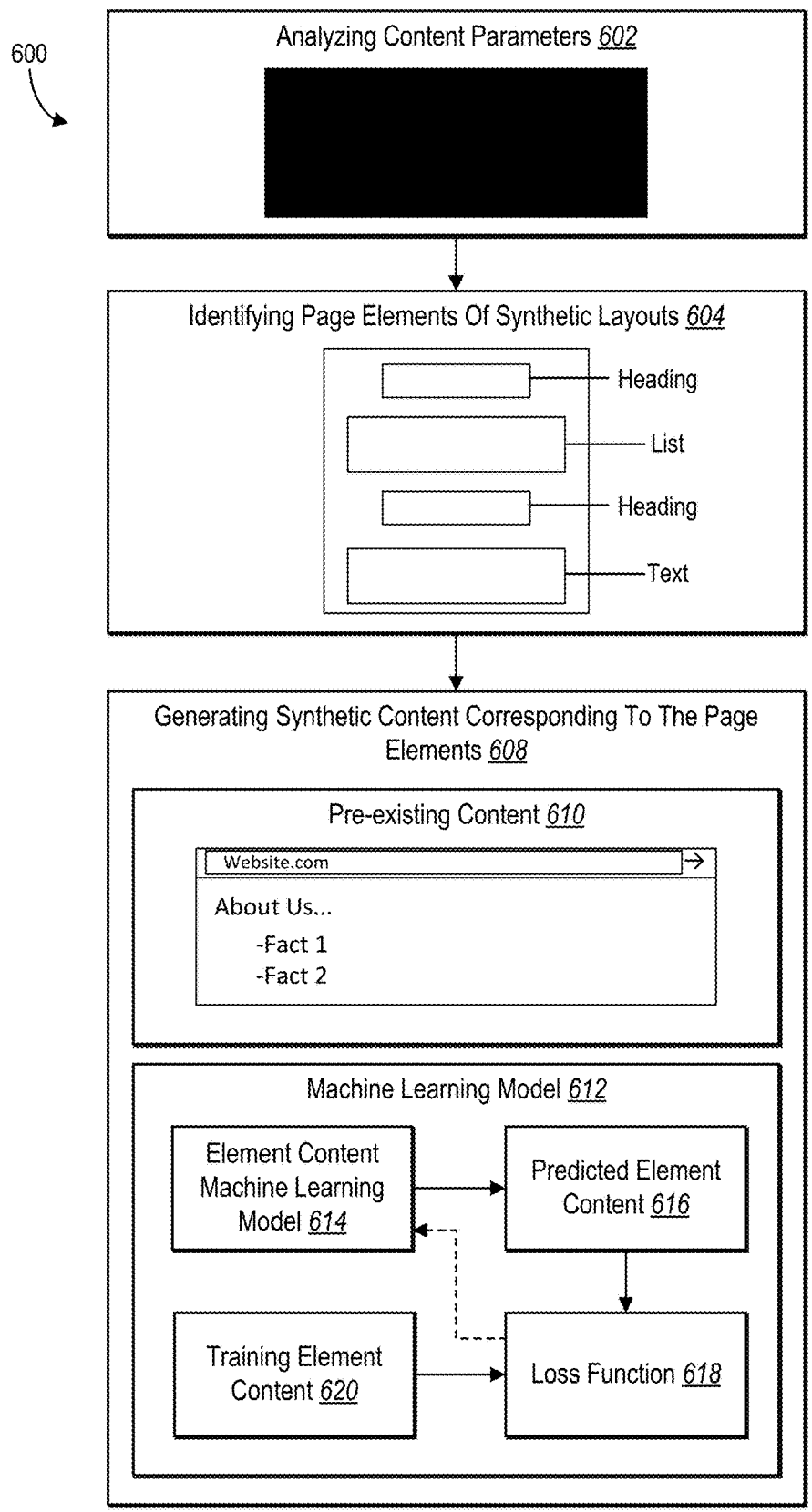
FIG. 6 illustrates a series of acts for generating synthetic content in accordance with one or more embodiments of the present disclosure.
Figure 7:
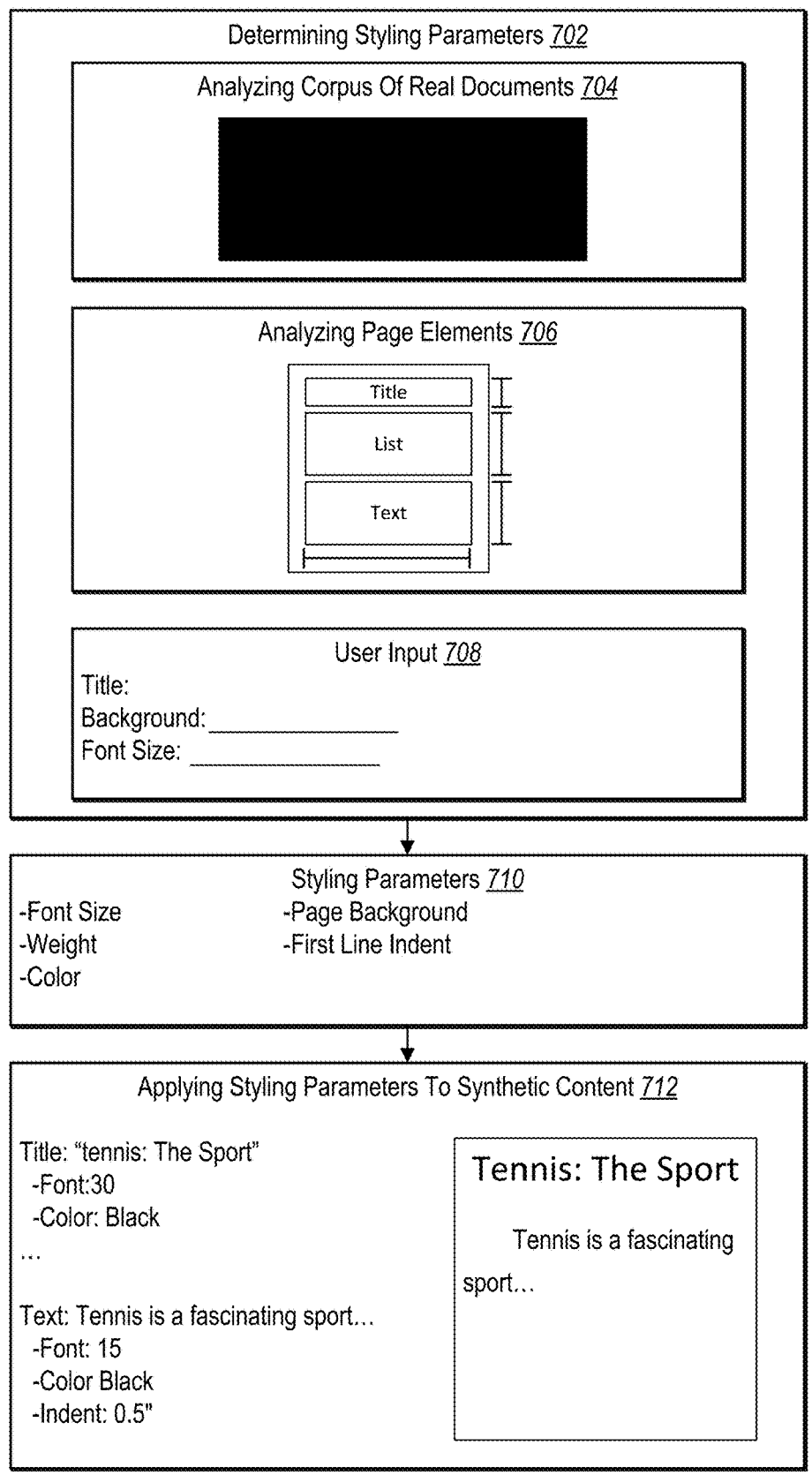
FIG. 7 illustrates a series of acts for filling a generated document with synthetic content in accordance with one or more embodiments of the present disclosure.

FIG. 3 generally illustrates the acts of generating synthetic layouts, generating synthetic content, and generating labeled synthetic documents. The following figures provide additional detail regarding each of these acts. FIG. 4 illustrates an example generative adversarial network that the synthetic document generation system 106 can utilize to generate realistic image layouts. FIG. 5 illustrates how the synthetic document generation system 106 may switch out page elements within an image layout. FIG. 6 and the accompanying discussion provide additional detail for how the synthetic document generation system 106 generates synthetic content. FIG. 7 illustrates how the synthetic document generation system 106 inserts the synthetic content into generated documents.

FIG. 4 illustrates a diagram of a generative adversarial network 400 that includes an image layout prediction neural network 402 and an adversarial discrimination neural network 404. The image layout prediction neural network 402 can generate synthetic image layouts 414. The generative adversarial network 400 uses the adversarial discrimination neural network 404 to train the image layout prediction neural network 402 to generate realistic synthetic image layouts.

In particular, the synthetic document generation system 106 can train the adversarial discrimination neural network 404 to classify images layouts as real or fake (i.e., non-realistic). For example, in one or more embodiments, the synthetic document generation system 106 trains the adversarial discrimination neural network 404 using real image layouts 416 to learn properties and characteristics of real image layouts. For instance, the real image layouts 416 includes image layouts obtained from a repository, downloaded from the Internet, or otherwise generated from real documents. Once initially trained, the adversarial discrimination neural network 404 can receive image layouts and classify the image layouts as real or fake.

In addition, the synthetic document generation system 106 can train both the image layout prediction neural network 402 and the adversarial discrimination neural network 404 using the synthetic image layouts (e.g., real image layouts 416 and/or synthetic image layouts 414). To illustrate, the synthetic document generation system 106 feeds the adversarial discrimination neural network 104 a synthetic image layout 414, which the adversarial discrimination neural network 104 classifies as real or fake. The synthetic document generation system 106 provides the classification in the form of feedback 418 to one or more of the image layout prediction neural network 402 and the adversarial discrimination neural network 404. In this manner, the feedback 418 indicates to the image layout prediction neural network 402 whether the synthetic image layout 414 fooled the adversarial discrimination neural network 404 into classifying the synthetic image layout 414 as a real image layout. If the image layout prediction neural network 402 did not fool the adversarial discrimination neural network 404, the synthetic document generation system 106 can iteratively update the weights and parameters of the image layout prediction neural network 402 using backpropagation and the Adam optimizer or other similar optimizers to improve the ability of the image layout prediction neural network 402 to generate realistic synthetic image layouts.

If the adversarial discrimination neural network 404 classified the synthetic image layout 114 as real, the synthetic document generation system 106 can update the weights and parameters of the adversarial discrimination neural network 404 to better classify image layouts. Because the image layout prediction neural network 402 and the adversarial discrimination neural network 404 are competing with each other, the synthetic document generation system 106 can take turns sequentially updating each network for a specified number of iterations, or until both networks converge or reach an equilibrium (e.g., the generative adversarial network converges).

The synthetic document generation system 106 employs the trained generative adversarial network 400 to generate realistic image layouts. In at least one embodiment, the synthetic document generation system 106 can provide layout parameters 406 to the trained generative adversarial network 400 to bias the distribution of the image layouts 414. In at least one embodiment, the synthetic document generation system 106 implements the layout parameters 406 to generate diverse image layouts.

As mentioned, the synthetic document generation system 106 can utilize the layout parameters 406 to control the distribution of generated image layouts. The synthetic document generation system 106 controls the kind of image layouts generated by the image layout prediction neural network 402. In at least one embodiment, the synthetic document generation system 106 applies the layout parameters 406 to the real image layouts 416 utilized in training the image layout prediction neural network 402. For instance, the synthetic document generation system 106 can utilize the layout parameters 406 to resemble infographics or cover pages. In at least one embodiment, the synthetic document generation system 106 determines the image layouts using predefined hand-written XML templates. The synthetic document generation system 106 varies the templates using random noise or by predefined templates. Furthermore, the synthetic document generation system 106 ensures that the generated image layouts accurately reflect image layouts in real documents by capturing a distribution of real document characteristics. For example, the synthetic document generation system 106 applies the layout parameters 406 to ensure that the training real image layouts 416 include a distribution of real documents with characteristics that reflect a broader body of real documents.

In at least one embodiment, the synthetic document generation system 106 defaults to generating layout parameters 406 for the layout prediction neural network 402 based on the distribution of document types and page elements as real world documents. For example, the synthetic document generation system 106 identifies a distribution of real-world documents by analyzing page elements, layouts, or other characteristics of the real world documents. The synthetic document generation system 106 generates the layout parameters 406 so that the generated image layouts mirror the characteristics as the real-world documents. In one or more embodiments, the synthetic document generation system 106 generates the layout parameters 406 based on user input. For instance, the synthetic document generation system 106 can generate the layout parameters 406 to bias the image layout prediction neural network 402 to generate image layouts for specific types of documents (e.g., technical papers, essays, brochures, etc.) or that have particular page elements.

The synthetic document generation system 106 uses the trained image layout prediction neural network 402 to generate image layouts that are practically indistinguishable from the real image layouts 416. However, in certain circumstances, image layouts including desired page elements may be scarce. For instance, the synthetic document generation system 106 may access an insufficient number of image layouts for documents including asides (i.e., a particular page element) to train the image layout prediction neural network 402 to generate image layouts with asides. To account for cases where synthetic image layouts (e.g., the real image layouts 416) are scarce, the synthetic document generation system 106 can utilize algorithmic approaches to transform real image layouts into synthetic image layouts that include the desired page elements.

As mentioned, the synthetic document generation system 106 can use an algorithmic approach to swap out page elements within real image layouts with desired page elements to create synthetic image layouts. For example, FIGS. 5A-5B illustrate a real image layout 502 and a transformed synthetic image layout 504 that the synthetic document generation system 106 generates from the real image layout 502 using an algorithmic approach. FIG. 5A illustrates the real image layout 502 comprising an original page element 506. The synthetic document generation system 106 uses the real image layout 502 as a template to generate a synthetic image layout comprising a desired page element. In particular, the synthetic document generation system 106 generates the transformed image layout 504 of FIG. 5B by swapping out the original page element 506 with a modified page element 508 and a desired page element 510.

In at least one embodiment, the synthetic document generation system 106 utilizes computer vision to replace the original page element 506 with the modified page element 508 and the desired page element 510. In particular, the synthetic document generation system 106 acquires and analyzes the real image layout 502. The synthetic document generation system 106 identifies page elements based on visual characteristics (e.g., color coding, shapes, weights, etc.) of the image layout 502. The synthetic document generation system 106 determines page elements to remove or alter to insert the desired page element.

As illustrated in FIGS. 5A-5B, the synthetic document generation system 106 modifies the original page element 506 to accommodate the desired page element 510. In at least one embodiment, the synthetic document generation system 106 identifies that the original page element 506 occupies enough area to accommodate the desired page element 510. Thus, the synthetic document generation system 106 reduces the size of the original page element 506 to the size of the modified page element 508 and adds the desired page element 510. In at least one other embodiment, the synthetic document generation system 106 generates a priority hierarchy reflecting fundamental page elements. The synthetic document generation system 106 replaces and modifies page elements of lower priority to insert the desired page element. Although FIGS. 5A-5B illustrate how the synthetic document generation system 106 inserts the desired page element 510 by shrinking the original page element 506 to the modified page element 508, the synthetic document generation system 106 may also completely remove the original page element 506 to insert the desired page element 510.

In addition to generating synthetic layouts, the synthetic document generation system 106 also generates synthetic content. FIG. 6 illustrates a series of acts 600 for generating synthetic content corresponding to page elements within the synthetic layouts. As illustrated, the series of acts 600 includes an act 602 of analyzing content parameters, an act 604 of identifying page elements of synthetic layouts, and an act 608 of generating synthetic content corresponding to the page elements.

In the act 602, the synthetic document generation system 106 can analyze content parameters that dictate the type and characteristics of content. For instance, content parameters might dictate the language of text, types and color schemes of images, types and color schemes of figures including tables and charts, and other content characteristics. Additionally, as illustrated, content parameters may dictate a distribution of content characteristics for a group of synthetic documents. For instance, based on analyzing the content parameters, the synthetic document generation system 106 can identify proportions of content conforming to certain characteristics.

The synthetic document generation system 106 performs the act 604 of identifying page elements of synthetic layouts. In at least one embodiment, as part of the act 604, the synthetic document generation system 106 visually analyzes the image layouts to identify page elements. For example, the synthetic document generation system 106 can utilize computer vision techniques to differentiate between different page element types based on the colors of the page elements, shapes, sizes, or weights of various page elements. In at least one other embodiment, the synthetic document generation system 106 analyzes values within page layout files to identify the page elements. For instance, for page layouts captured using a CSV format, the synthetic document generation system 106 can parse the file and identify page elements by reading the values indicating page element types.

As part of the act 608 of the series of acts 600, the synthetic document generation system 106 can generate synthetic content corresponding to the page elements. As illustrated, the synthetic document generation system 106 can generally utilize two approaches to generate synthetic content. First, the synthetic document generation system 106 can identify and access pre-existing content 610. The synthetic document generation system 106 can also generate synthetic content by utilizing a machine learning model 612. In both approaches, the synthetic document generation system 106 bases the generation of the synthetic content for the identified page elements on the analyzed content parameters.

As illustrated in FIG. 6, the synthetic document generation system 106 can generate synthetic content by accessing and retrieving the pre-existing content 610. The synthetic document generation system 106 can search online and offline databases to identify content for page elements that complies with the content parameters. In at least one embodiment, the synthetic document generation system 106 identifies pre-existing content that includes all of the page elements as those within the synthetic layouts 604. For example, the synthetic document generation system 106 searches for pre-existing content that includes two headings, one list, and one text body. The synthetic document generation system 106 may also conduct searches for pre-existing content specific to a page element. For example, the synthetic document generation system 106 may search an online source for headings in a particular language. The synthetic document generation system 106 repeats this process for each page element within a synthetic layout. The synthetic document generation system 106 may also consult a single pre-existing content source for a portion of page elements and access additional sources for other page elements. For example, the synthetic document generation system 106 uses a heading, list, and heading from the same online source. If the online source lacks a page element, the synthetic document generation system 106 accesses additional online sources or generates the required synthetic content using machine learning.

As illustrated in FIG. 6, the synthetic document generation system 106 performs the act 608 of generating synthetic content corresponding to the page elements optionally by utilizing a machine learning model 612. In particular, the synthetic document generation system 106 can train and utilize an element content machine learning model 614. The synthetic document generation system 106 trains the element content machine learning model 614 to generate synthetic content specific to page elements. For instance, the synthetic document generation system 106 can train a language model to generate word sequences that read like headings and another language model to generate content that reads like lists. Additionally, the synthetic document generation system 106 can utilize image models to generate images and figures.

As illustrated in FIG. 6, during training, the element content machine learning model 614 generates predicted element content 616. The synthetic document generation system 106 accesses training element content 620 including existing content and compares the training element content 620 comprising page-element-specific content with the predicted element content 616. For example, the synthetic document generation system 106 accesses existing headings to train an element content machine learning model for headings. The synthetic document generation system 106 utilizes a loss function 618. The synthetic document generation system 106 alters parameters within the element content machine learning model 614 to generate more realistic predicted element content.

In at least one embodiment, the synthetic document generation system 106 uses a combination of the pre-existing content 610 and the machine learning model 612 to generate synthetic content. The synthetic document generation system 106 can determine to use the pre-existing content 610 to fill certain types of page elements such as images and figures, and the synthetic document generation system 106 can determine to use the machine learning model 612 to generate page elements including text. In at least one embodiment, the synthetic document generation system 106 utilizes, by default, the pre-existing content 610 to identify content corresponding to page elements and generates synthetic content using the machine learning model 612 only when the pre-existing content 610 is missing particular page elements.

After generating synthetic layouts and synthetic content, the synthetic document generation system 106 inserts the synthetic content into corresponding page elements of generated documents with page elements sized and positioned based on the generated image layouts. FIG. 7 illustrates a determining and applying styling parameters to synthetic content to fit the synthetic content into the synthetic layouts in accordance with one or more embodiments. Generally, styling parameters dictate styling characteristics of content within a page element. For example, the synthetic document generation system 106 applies styling parameters to synthetic content to ensure that the content fills the page elements in a realistic manner. Styling parameters dictate styling characteristics such as font style, size, weight, and color as well as backgrounds, spacing, and other characteristics. As illustrated, the synthetic document generation system 106 performs act 702 of determining style parameters to generate various styling parameters 710. The synthetic document generation system 106 performs act 712 of applying the styling parameters to synthetic content.

As part of act 702 of determining styling parameters, the synthetic document generation system 106 can analyze a corpus of real documents 704, analyze page elements 706, and/or receive user input 708. As part of analyzing the corpus of real documents 704, the synthetic document generation system 106 accesses and extracts styling characteristics from the corpus of real documents 704. For instance, the synthetic document generation system 106 identifies font and page characteristics of the corpus of real documents 704. The synthetic document generation system 106 can directly derive styling parameters from styling characteristics from the corpus of real documents 704. Additionally, the synthetic document generation system 106 can analyze a distribution of styling characteristics of the corpus of real documents 704.

The synthetic document generation system 106 also can determine styling parameters based on analyzing the page elements 706. In order to ensure that synthetic content fits realistically into the page elements of synthetic layouts (including image layouts), the synthetic document generation system 106 can determine dimensions of the page elements within the synthetic layouts. For example, the synthetic document generation system 106 determines appropriate spacing and sizing to ensure that the synthetic content is not over or undersized when inserted into the corresponding page elements. Additionally, the synthetic document generation system 106 determines styling parameters to ensure that styling characteristics are consistent among page elements. For example, the synthetic document generation system 106 determines that font size of text within a list should not exceed the font size of text within a title. Additionally, the font size within a text element can be based on heading size, which can in turn be based on page width.

As illustrated in FIG. 7, the synthetic document generation system 106 can optionally determine styling parameters based on the user input 708. As illustrated, the synthetic document generation system 106 can prompt the user to input desired styling characteristics of the synthetic documents. For example, the synthetic document generation system 106 can prompt the user to enter a desired font size and background for a title element of a document. Furthermore, the synthetic document generation system 106 may prompt the user to enter desired styling parameters for a group of synthetic documents. For instance, the synthetic document generation system 106 prompts the user to enter desired styling characteristics for a desired proportion of synthetic documents.

The synthetic document generation system 106 can optionally generate the styling parameters 710. As mentioned, the styling parameters 710 comprise characteristics of content within page elements. The synthetic document generation system 106 can vary the styling parameters 710 to amplify the diversity of generated documents and also ensure that synthetic documents look like real-world documents. The styling parameters 710 dictate styling characteristics including font size, font weight, font color, page backgrounds, first line indents, and others.

As further illustrated in FIG. 7, the synthetic document generation system 106 performs the act 712 of applying styling parameters to synthetic content. The synthetic document generation system 106 applies styling parameters to synthetic content for each page element. As illustrated, the synthetic document generation system 106 determines a font size (e.g., 30) and font color (e.g., black) for the text content "Tennis: The Sport" for the title page element. The synthetic document generation system 106 applies the styling parameters and inserts the content into a document generated with paged elements dictated by the image layout. The synthetic document generation system 106 repeats this process for synthetic content corresponding to each page element.

The synthetic document generation system 106 generates a labeled document. Though not illustrated, the synthetic document generation system 106 correctly labels page elements as the synthetic document generation system 106 inserts synthetic content. For example, the synthetic document generation system 106 creates PDF pages with page elements at locations dictated by the synthetic layout. The synthetic document generation system 106 labels documents using labels as described above in relation to FIG. 2.

Figure 8:
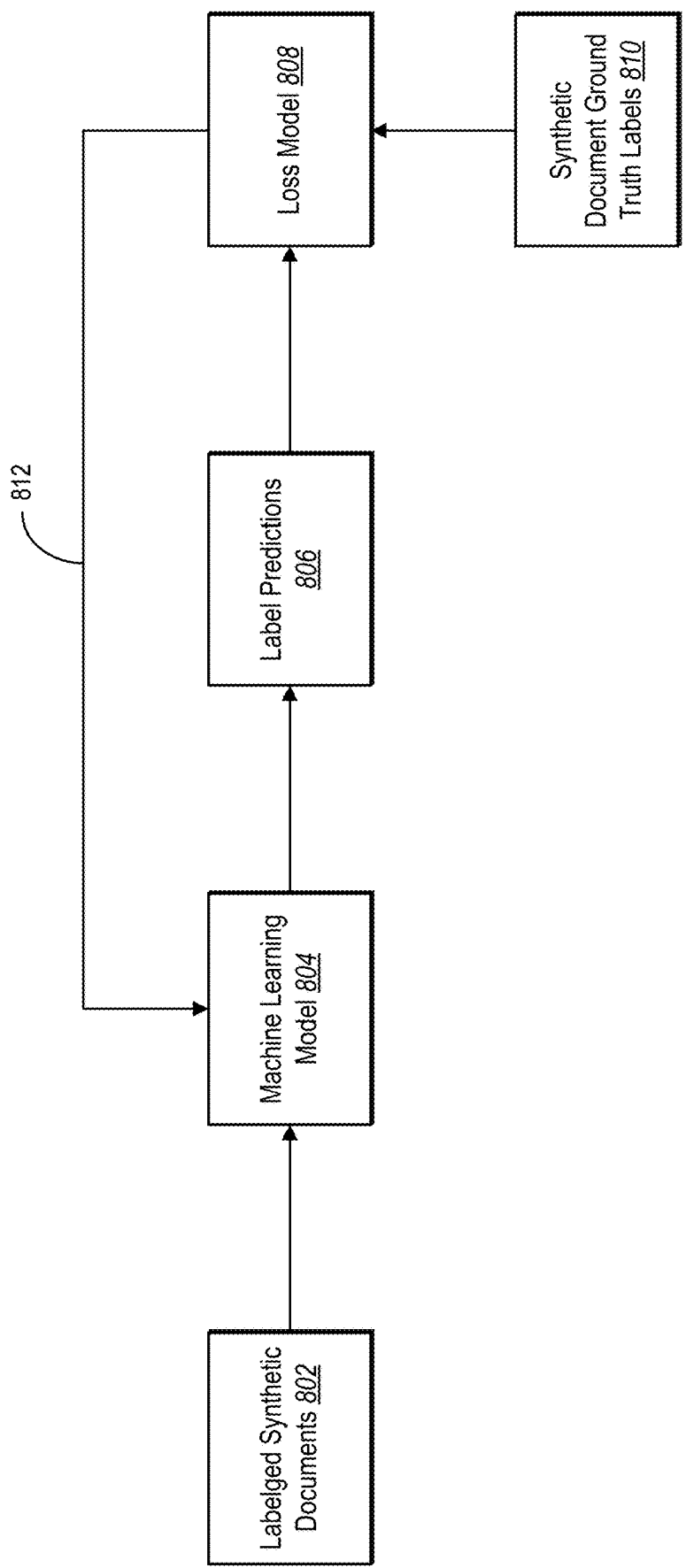
FIG. 8 illustrates an overview of training a machine learning model using synthetic documents generated in accordance with one or more embodiments of the present disclosure.

The synthetic document generation system 106 can repeat the acts and processes described above in relation to FIGS. 3-7 to generate a plurality of fully labeled synthetic documents (e.g., PDFs). The document management system 104 can then use the labeled synthetic documents to train a machine learning model. For example, FIG. 8 illustrates an overview of a process of training a machine learning model using labeled synthetic documents generated in accordance with one or more embodiments described herein. As illustrated, the machine learning model 804 processes a synthetic document 802 and generates a label predictions 805 for one or more page elements of the synthetic document 802. The document management system 104 the compares the label predictions 806 to ground truth labels for the synthetic document 810 using a loss model 808. The document management system 104 then back propagates 812 the loss to update the weights and parameters of the machine learning model 804. The document management system 104 can repeat this process until the machine learning model 804 converges. Due to the fully labeled nature, number, and the diversity of the labeled synthetic documents, the machine learning model 804, once trained, is robust and accurate.

The machine learning model 804 can comprise any number of different machine learning models, such as, for example, a neural network. The machine learning model 804 can also perform one or more tasks, such as identifying and labeling page elements, converting scanned documents into edible PDFs with labeled fields, etc.

Figure 9:
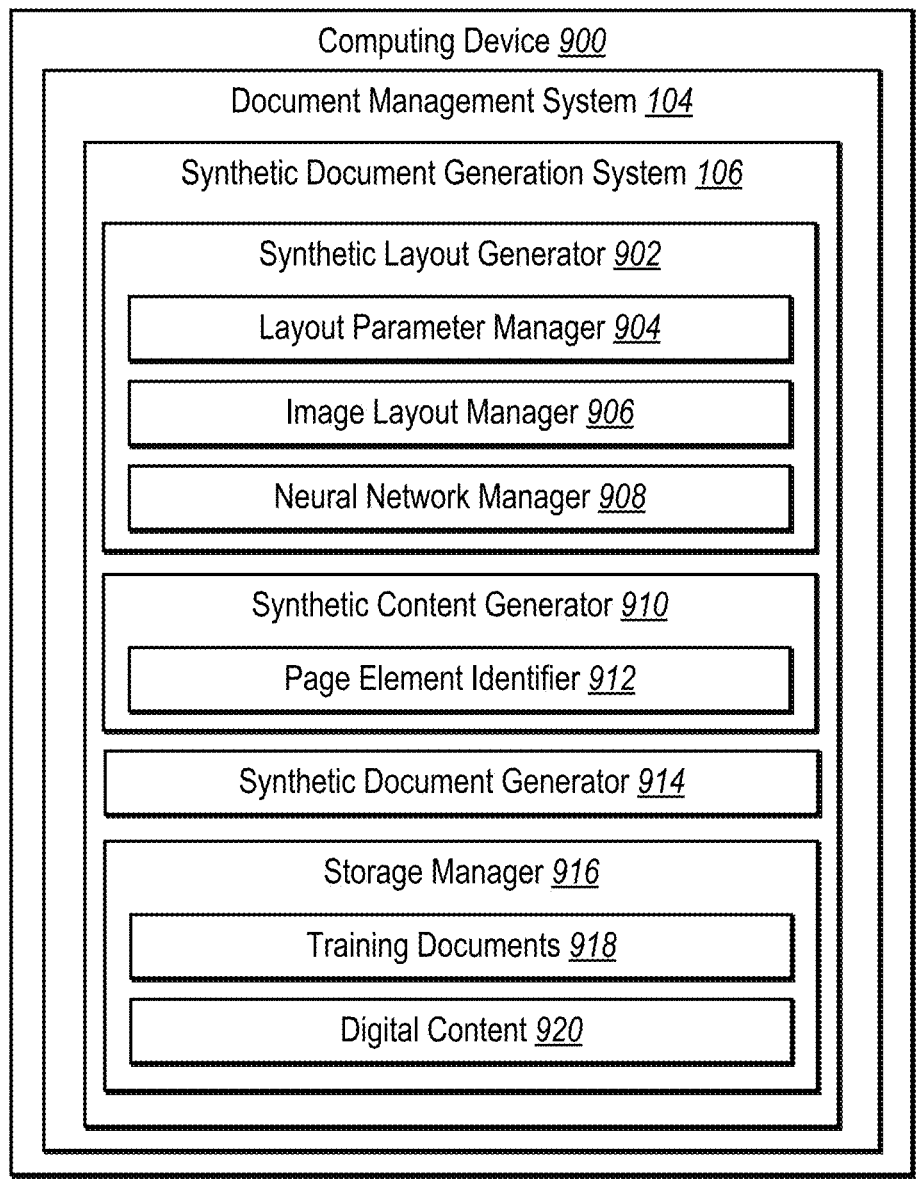
FIG. 9 illustrates a schematic diagram of an example architecture of a synthetic document generation system in accordance with one or more embodiments of the present disclosure.

Additional detail will now be provided regarding components and capabilities of the synthetic document generation system 106. FIG. 9 illustrates an example schematic diagram of the synthetic document generation system 106 within the document management system 104 on the example computing device 900 (e.g., one or more of the user client device 108 and the server device(s) 102). As shown in FIG. 9, the synthetic document generation system 106 may include a synthetic layout generator 902, a synthetic content generator 910, a synthetic document generator 914, and a storage manager 916.

As mentioned, the synthetic document generation system 106 includes the synthetic layout generator 902. The synthetic layout generator 902 includes a layout parameter manager 904, an image layout manager 906 and a neural network manager 908. The layout parameter manager 904 accesses real documents and user input to determine layout parameters. Furthermore, the layout parameter manager 904 stores determined layout parameters and communicates the layout parameters to the image layout manager 906.

The image layout manager 906 generates, manages, and stores image layouts. The image layout manager 906 also stores rules for identifying page elements. For instance, the image layout manager 906 maintains a key that links page element characteristics (e.g., color, shape, etc.) as represented within the image layout to page elements. Furthermore, the image layout manager 906 can communicate with the neural network manager 908 to store image layouts generated by the neural network. The image layout manager 906 may also generate various file types to capture the image layouts. For instance, the image layout manager 906 can store image layouts as ASCII files using CSV format.

The neural network manager 908 trains, manages, and applies neural networks to generate image layouts. The neural network manager 908 can train and apply the generative adversarial network 400. The neural network manager 908 accesses real image layouts for training the generative adversarial network. Where the training data is lacking with regard to specific page elements, the neural network manager 908 can alter training data to include desired page elements. Furthermore, the neural network manager 908 manages the image layout prediction neural network and the adversarial discrimination neural network that are part of the generative adversarial network. The neural network manager 908 can send the image layouts generated by the GAN to the image layout manager 906.

The synthetic document generation system 106 also includes the synthetic content generator 910. The synthetic content generator 910 creates, manages, and sends synthetic content corresponding to page elements. Generally, the synthetic content generator 801 communicates with the synthetic layout generator 902 to receive synthetic layouts (including image layouts) and with the synthetic document generator 914 to send synthetic content. The synthetic content generator 910 identifies page elements using the synthetic a page element identifier 912 and generates synthetic content corresponding to each of the identified page elements. The synthetic content generator 910 can access and extracts data from existing sources and/or utilizes a machine learning model to generate page-element-specific content.

The synthetic content generator 910 includes a page element identifier 912. In particular, the page element identifier 912 analyzes synthetic layouts. More specifically, in at least one embodiment, the page element identifier 912 analyzes image layouts generated by the synthetic layout generator 902. Based on visual characteristics of the image layouts, the page element identifier 912 determines the location, size, and type of page elements within the image layout.

The synthetic document generation system 106 includes the synthetic document generator 914. The synthetic document generator 914 communicates with the synthetic layout generator 902 to retrieve synthetic layouts and with the synthetic content generator 910 to retrieve the corresponding synthetic content. The synthetic document generator 914 determines and applies styling parameters to the synthetic content and inserts synthetic content into the corresponding page elements of generated documents with page element sized and positioned as dictated by the synthetic layouts.

The synthetic document generation system 106 includes the storage manager 916. The storage manager 916 includes training documents 918 and digital content 920. The training documents 918 store real documents for access by neural networks and other machine learning models utilized by the synthetic document generation system 106. The training documents 918 include real documents used to train the GAN for image layout generation. Furthermore, the training documents 918 include documents used to train machine learning models for content generation.

The digital content 920 comprises generated synthetic documents and the digital content within the synthetic documents. For example, the digital content 920 includes digital text, images, and figures. Additionally, the digital content 920 can store digital audio, video, and other types of media files.

In one or more embodiments, each of the components of the synthetic document generation system 106 are in communication with one another using any suitable communication technologies. Additionally, the components of the synthetic document generation system 106 can be in communication with one or more other devices including one or more client devices described above. It will be recognized that although the components of the synthetic document generation system 106 are shown to be separate in FIG. 9, any of the subcomponents may be combined into fewer components, such as into a single component, or divided into more components as may serve a particular implementation. furthermore, although the components of FIG. 9 are described in connection with the synthetic document generation system 106, at least some of the components in performing operations in conjunction with the synthetic document generation system 106 described herein may be implemented on other devices within the environment.

The components of the synthetic document generation system 106 can include software, hardware, or both. For example, the components of the synthetic document generation system 106 can include one or more instructions stored on a computer-readable storage medium and executable by processors of one or more computing devices (e.g., the computing device 900 or the computing device 1200 of FIG. 12). When executed by the one or more processors, the computer-executable instructions of the synthetic document generation system 106 can cause the computing device 900 to perform the methods described herein. Alternatively, the components of the synthetic document generation system 106 can comprise hardware, such as a special purpose processing device to perform a certain function or group of functions. Additionally, or alternatively, the components of the synthetic document generation system 106 can include a combination of computer-executable instructions and hardware.

Furthermore, the components of the synthetic document generation system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the synthetic document generation system 106 may be implemented as part of a stand-alone application on a personal computing device or a mobile device. Alternatively or additionally, the components of the synthetic document generation system 106 may be implemented in any application that allows creation, storage, and delivery of digital content to users, including, but not limited to, applications a part of ADOBE® DOCUMENT CLOUD, ADOBE® CREATIVE CLOUD® and/or ADOBE® MARKETING CLOUD, such as ADOBE®, ACROBAT®, ADOBE® READER, ADOBE® SCAN, and ADOBE® FILL & SIGN. "ADOBE," "ACROBAT," "READER," "CREATIVE CLOUD," "MARKETING CLOUD," and "ADOBE MARKETING CLOUD," are registered trademarks of Adobe Systems Incorporated in the United States and/or other countries.

FIGS. 1-9, the corresponding text, and the examples provide a number of different systems, methods, and non-transitory computer readable media for generating and providing synthetic documents. In addition to the foregoing, embodiments can also be described in terms of flowcharts comprising acts for accomplishing a particular result. For example, FIGS. 9-10 illustrates flowcharts of example sequences of acts in accordance with one or more embodiments.

Figure 10:
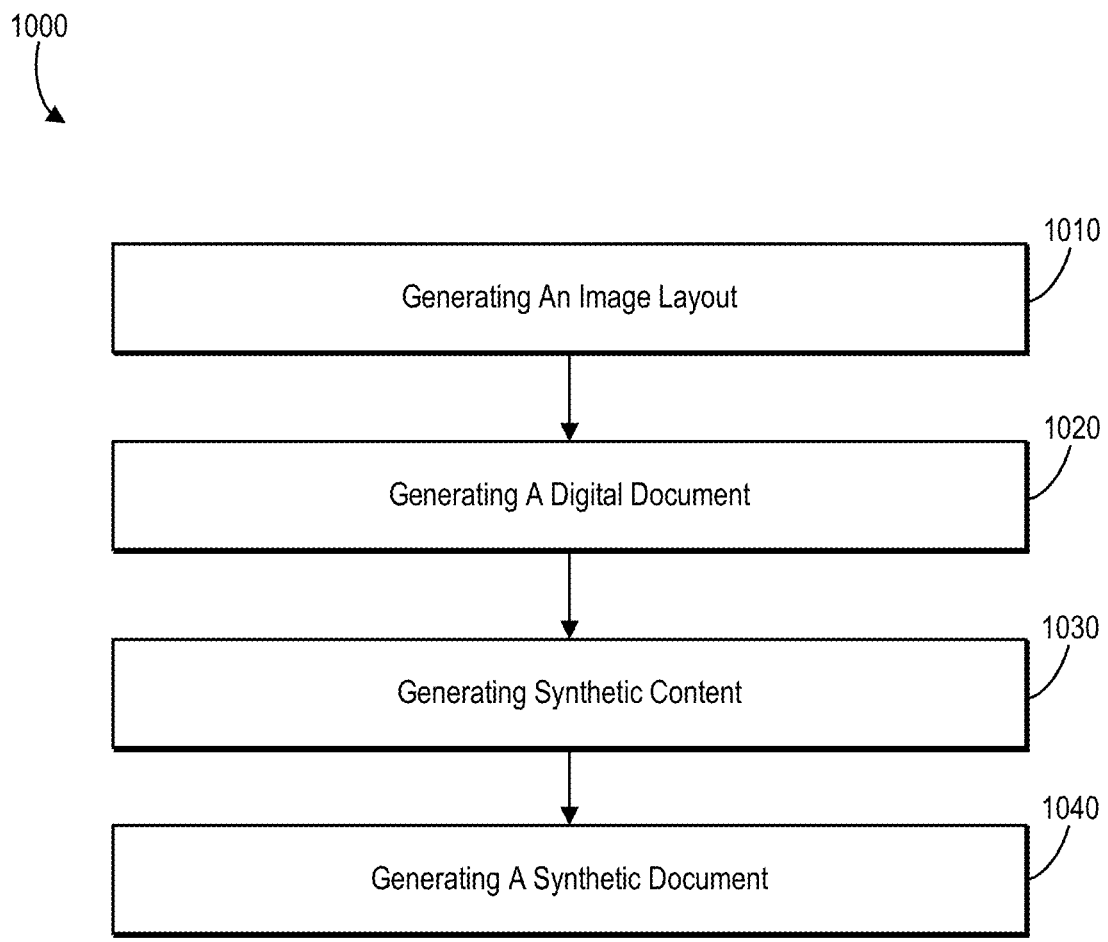
FIG. 10 illustrates a series of acts for generating a synthetic document in accordance with one or more embodiments of the present disclosure.

While FIGS. 9-10 illustrate acts according to one embodiment, alternative embodiments may omit, add to, reorder and/or modify any of the acts shown in FIGS. 9-10. The acts of FIGS. 9-10 can be performed as part of a method. Alternatively, a non-transitory computer readable medium can comprise instructions that, when executed by one or more processors, cause a computing device to perform the acts of FIGS. 9-10. In still further embodiments, a system can perform the acts of FIGS. 9-10. Additionally, the acts described herein may be repeated or performed in parallel with one another or in parallel with different instances of the same or similar acts.

FIG. 10 illustrates an example series of acts 1000 of generating a synthetic document. The series of acts 1000 includes an act 1010 of generating an image layout. In particular, the act 1010 includes utilizing a neural network to generate an image layout comprising page elements. For example, act 1010 can comprise generating an image layout utilizing a neural network. In particular, act 1010 can comprise generating an image of a document with indications of page elements. The act 1010 can further comprise generating, by an image layout prediction neural network, a predicted image layout; feeding the image layout to an adversarial discrimination neural network to determine if the predicted image layout resembles realistic image layouts; and training the image layout prediction neural network based on the determination of the adversarial discrimination neural network. Additionally, the act 1010 can further comprise accessing a real document; identifying a page element of the real document; and replacing the page element of the real document with a new page element.

As illustrated in FIG. 10, the series of acts 1000 includes an act 1020 of generating a digital document. For example, act 1020 can involve generating a digital document corresponding to the image layout. In particular, act 1020 can involve generating a digital document comprising page elements corresponding to the indication of page elements in the image layout. For instance, act 1020 can involve generating a PDF document with page elements in locations and with sizes based on the indications of page elements in the image layout.

As illustrated in FIG. 10, the series of acts 1000 includes an act 1030 of generating synthetic content. In particular, the act 1030 comprises generating synthetic content corresponding to the page elements. The act 1030 can further comprise training a machine learning model using real page content corresponding to real page elements; and generating, by the trained machine learning model, synthetic content corresponding to the page elements. Furthermore, the act 1030 comprises an additional act of determining page elements of real content that correspond to the page elements of the synthetic document.

The series of acts 1000 additionally includes an act 1040 of generating a synthetic document. In particular, the act 1040 comprises generating a synthetic document by inserting the synthetic content into the corresponding page elements within a digital document generated based on the image layout. The act 1040 further comprises the acts of determining styling parameters for the synthetic document; and applying the styling parameters to the synthetic content within the synthetic document. Additionally, the act 1040 includes the act of determining the styling parameters based on style characteristics of the page elements. The act 1040 further comprises an act of determining the styling parameters based on style characteristics of a distribution of real documents.

Figure 11:
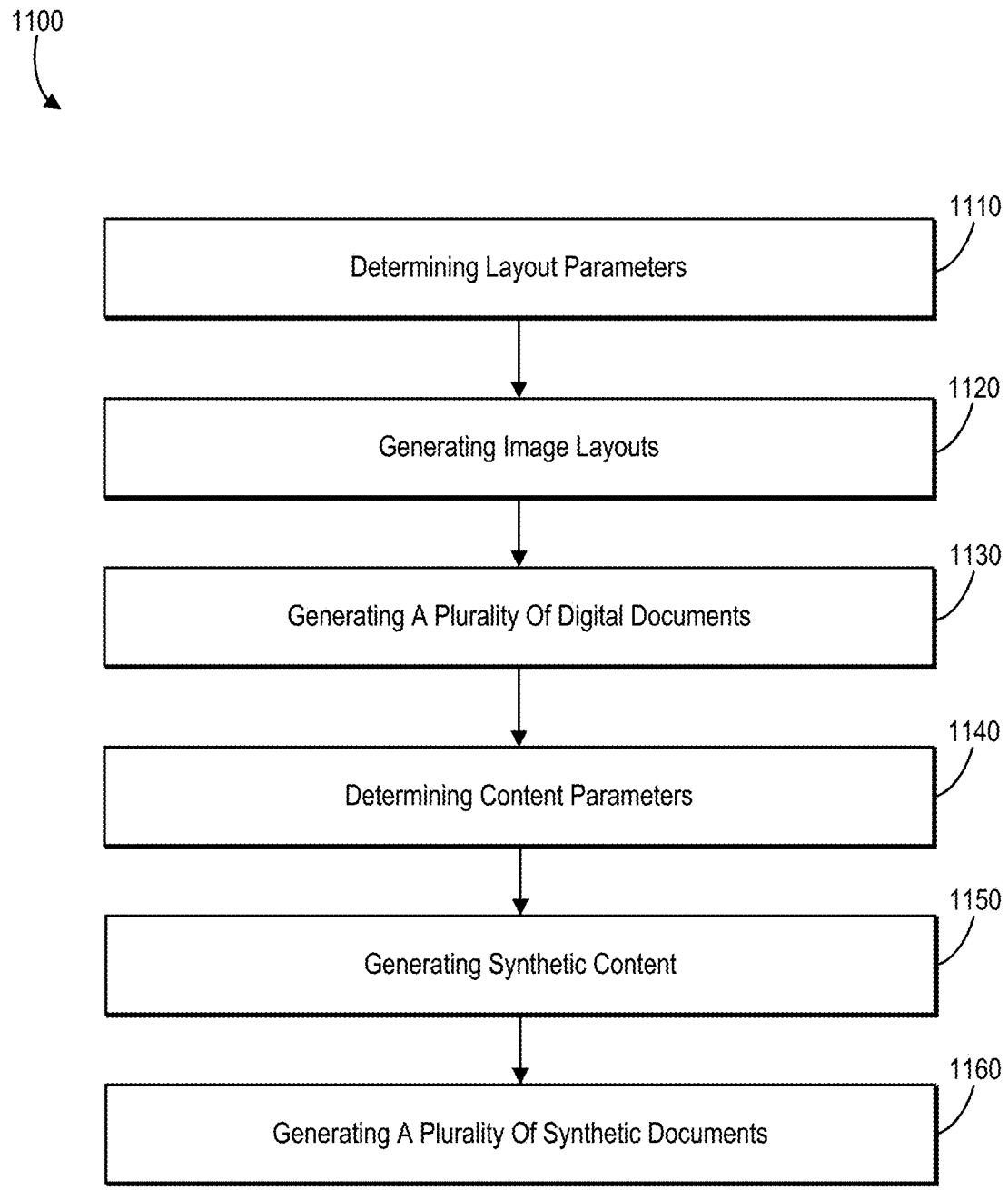
FIG. 11 illustrates a series of acts for generating a plurality of synthetic documents in accordance with one or more embodiments of the present disclosure.

FIG. 11 illustrates an example series of acts 1100 of generating a plurality of synthetic documents. As illustrated, the series of acts 1100 includes an act 1110 of determining layout parameters. In particular, the act 1110 comprises determining layout parameters for a plurality of image layouts. The act 1110 can further comprise an act of determining the layout parameters based on user input. Additionally, the act 1110 can comprise an act of analyzing layout characteristics of a plurality of real documents, wherein the layout parameters comprise the layout characteristics.

The series of acts 1100 includes an act 1120 of generating image layouts. In particular, the act 1120 comprises generating a plurality of image layouts comprising page elements conforming to the layout parameters. Additionally, the act 1120 can comprise the acts of generating, by an image layout prediction neural network, predicted image layouts; feeding the predicted image layouts to an adversarial discrimination neural network to determine if the predicted image layouts resemble realistic image layouts; and training the image layout prediction neural network based on the determination of the adversarial discrimination neural network.

As illustrated in FIG. 11, the series of acts 1100 includes an act 1130 of generating a plurality of digital document. For example, act 1130 can involve generating a plurality of digital document corresponding to the plurality of image layouts. In particular, act 1020 can involve generating a digital documents each comprising page elements corresponding to the indications of page elements in a corresponding image layout. For instance, act 1020 can involve generating a plurality of PDF documents with page elements in locations and with sizes based on the indications of page elements in the image layouts.

As illustrated in FIG. 11, the series of acts 1100 includes an act 1140 of determining content parameters. In particular, the act 1140 comprises determining content parameters for synthetic content corresponding to the page elements.

The series of acts 1100 includes an act 1150 of generating synthetic content. In particular, the act 1150 comprises generate the synthetic content corresponding to the page elements, wherein the synthetic content conforms to the content parameters. The act 1150 can further comprise the acts of training a machine learning model using real page content corresponding to real page elements; and generating, by the trained machine learning model, synthetic content corresponding to the page elements.

The series of acts 1100 includes an act 1160 of generating a plurality of synthetic documents. In particular, the act 1160 comprises generating a plurality of synthetic documents by inserting the synthetic content into the corresponding page elements of a plurality of generated documents with page elements sized and positioned as dictated by the plurality of image layouts. The act 1160 further comprises determining styling parameters for the plurality of synthetic documents; and applying the parameters to the synthetic content within the plurality of synthetic documents. The act 1160 further comprises generating the synthetic document based on style characteristics of the page elements. Additionally, the act 1160 can comprise determining the styling parameters based on style characteristics of a distribution of real documents.

The series of acts 1100 can include the additional act of generating element labels for the plurality of synthetic documents, wherein the element labels indicate the page elements within the plurality of synthetic documents.

In addition (or in the alternative) to the acts described above, in some embodiments, the series of acts 1000 and the series of acts 1100 include a step for generating synthetic documents with element labels. For example, the acts described in reference to FIGS. 3-4 and FIGS. 5A-5B can comprise the corresponding acts (or structure) for performing a step for generating a plurality of image layouts conforming to layout parameters. Additionally, the acts described in reference to FIG. 6 can comprise the corresponding acts (or structure) for performing a step for generating synthetic content conforming to content parameters.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
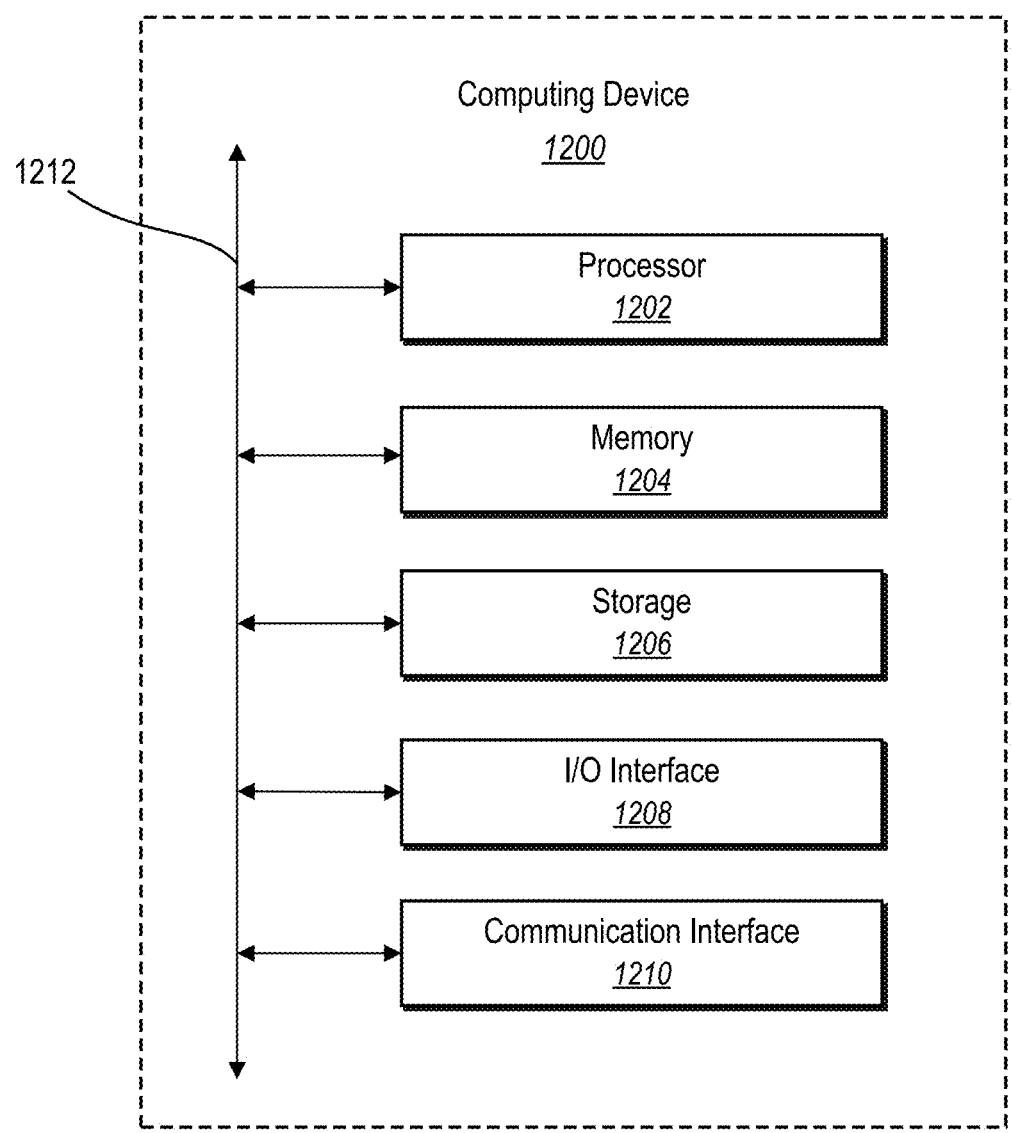
FIG. 12 illustrates a block diagram of an example computing device in accordance with one or more embodiments of the present disclosure.

FIG. 12 illustrates, in block diagram form, an example computing device 1200 (e.g., user client device 108 and/or server device(s) 102) that may be configured to perform one or more of the processes described above. One will appreciate that the synthetic document generation system 106 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium for generating synthetic documents, the non-transitory computer readable medium comprising instructions that, when executed by at least one processor, cause a computing device to:
   generate, utilizing a neural network, a new image layout comprising an image of a document indicating structure of page elements within the document;
   generate a digital document corresponding to the new image layout, the digital document comprising page elements corresponding to the structure of page elements in the new image layout;
   generate synthetic content corresponding to the page elements; and
   generate a synthetic document by inserting the synthetic content into the corresponding page elements in the digital document.

2. The non-transitory computer readable medium as recited in claim 1, further comprising instructions that, when executed by the at least one processor, cause the computing device to generate the new image layout utilizing a generative adversarial network.

3. The non-transitory computer readable medium as recited in claim 1, further comprising instructions that, when executed by the at least one processor, cause the computing device to generate the new image layout by:
   accessing a real document;
   identifying a page element of the real document; and
   replacing the page element of the real document with a new page element.

4. The non-transitory computer readable medium as recited in claim 1, further comprising instructions that, when executed by the at least one processor, cause the computing device to generate the synthetic content corresponding to the page elements by generating, by utilizing a machine learning model, synthetic content corresponding to the page elements.

5. The non-transitory computer readable medium as recited in claim 1, further comprising generating the synthetic content corresponding to the page elements by determining page elements of real content that correspond to the page elements of the synthetic document.

6. The non-transitory computer readable medium as recited in claim 1, further comprising instructions that, when executed by the at least one processor, cause the computing device to generate the synthetic document by:
   determining styling parameters for the synthetic document; and
   applying the styling parameters to the synthetic content.

7. The non-transitory computer readable medium as recited in claim 6, further comprising instructions that, when executed by the at least one processor, cause the computing device to determine the styling parameters based on style characteristics of the page elements.

8. The non-transitory computer readable medium as recited in claim 6, further comprising instructions that, when executed by the at least one processor, cause the computing device to determine the styling parameters based on style characteristics of a distribution of real documents.

9. A system comprising:
   one or more memory devices storing a neural network; and
   at least one server configured to cause the system to:
      determine layout parameters;
      generate, utilizing the neural network, a plurality of new image layouts comprising images of documents indicating structures of page elements within the documents conforming to the layout parameters;

generate a plurality of digital documents corresponding to the plurality of new image layouts, each digital document of the plurality of digital documents comprising page elements corresponding to the structures of page elements in a corresponding new image layout;

determine content parameters for synthetic content corresponding to the page elements;

generate the synthetic content corresponding to the page elements, wherein the synthetic content conforms to the content parameters; and generate a plurality of synthetic documents by inserting the synthetic content into the corresponding page elements of the plurality of digital documents.

10. The system as recited in claim 9, wherein the at least one server is further configured to cause the system to generate element labels for the plurality of synthetic documents, wherein the element labels indicate the page elements within the plurality of synthetic documents.

11. The system as recited in claim 9, wherein the at least one server is further configured to cause the system to train a machine learning model using the plurality of synthetic documents.

12. The system as recited in claim 9, wherein the at least one server is further configured to cause the system to determine the layout parameters by analyzing layout characteristics of a plurality of real documents.

13. The system as recited in claim 9, wherein the at least one server is further configured to cause the system to generate the plurality of new image layouts by:

generating, by an image layout prediction neural network, predicted image layouts;

feeding the predicted image layouts to an adversarial discrimination neural network to determine if the predicted image layouts resemble realistic image layouts; and training the image layout prediction neural network based on the determination of the adversarial discrimination neural network.

14. The system as recited in claim 9, wherein the at least one server is further configured to cause the system to generate the synthetic content corresponding to the page elements by:

training a machine learning model using real page content corresponding to real page elements; and generating, by the trained machine learning model, synthetic content corresponding to the page elements.

15. The system as recited in claim 9, wherein the at least one server is further configured to cause the system to generate the plurality of synthetic documents by:

determining styling parameters for the plurality of synthetic documents; and applying the styling parameters to the synthetic content within the plurality of synthetic documents.

16. The system as recited in claim 15, wherein the at least one server is further configured to cause the system to generate a synthetic document based on style characteristics of the page elements.

17. The system as recited in claim 15, wherein the at least one server is further configured to cause the system to determine the styling parameters based on style characteristics of a distribution of real documents.

18. In a digital medium environment for training machine learning models using training documents, a computer-implemented method for generating synthetic documents with element labels comprising:

performing a step for generating a plurality of new image layouts conforming to layout parameters;

performing a step for generating synthetic content conforming to content parameters; and generating a plurality of synthetic documents comprising the plurality of new image layouts comprising the synthetic content.

19. The computer-implemented method as recited in claim 18, further comprising generating element labels for the plurality of synthetic documents, wherein the element labels indicate page elements within the plurality of synthetic documents.

20. The computer-implemented method as recited in claim 18, wherein the layout parameters comprise user input.

* * * * *